(12) United States Patent
Chen

(10) Patent No.: US 7,453,576 B2
(45) Date of Patent: Nov. 18, 2008

(54) METHOD AND SYSTEM FOR CALIBRATING A FIBER OPTIC GYROSCOPE

(75) Inventor: Chung-Jen Chen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 11/290,336

(22) Filed: Nov. 29, 2005

(65) Prior Publication Data

US 2007/0121117 A1 May 31, 2007

(51) Int. Cl.
*G01C 19/72* (2006.01)
(52) U.S. Cl. ..................................... 356/460
(58) Field of Classification Search .............. 356/460, 356/462–464, 477, 482, 483
See application file for complete search history.

(56) References Cited

U.S. PATENT DOCUMENTS

| | | | |
|---|---|---|---|
| 4,408,882 A * | 10/1983 | Sheem ....................... | 356/460 |
| 4,529,312 A * | 7/1985 | Pavlath et al. ............... | 356/460 |
| 4,874,244 A * | 10/1989 | Kersey ....................... | 356/460 |
| 5,123,741 A | 6/1992 | Spahlinger | |
| 5,351,123 A | 9/1994 | Spahlinger | |
| 5,355,208 A * | 10/1994 | Crawford et al. ............ | 356/483 |
| 5,473,430 A | 12/1995 | Kemmler | |
| 6,046,810 A | 4/2000 | Sanders et al. | |
| 6,211,963 B1 | 4/2001 | Kaliszek et al. | |
| 6,594,020 B2 | 7/2003 | Dyott | |
| 6,744,519 B2 | 6/2004 | Lange et al. | |

FOREIGN PATENT DOCUMENTS

JP          63-138208 A  *  6/1988

* cited by examiner

*Primary Examiner*—Samuel A Turner
(74) *Attorney, Agent, or Firm*—Black Lowe & Graham PLLC

(57) ABSTRACT

According to one aspect of the present invention, a method for calibrating a fiber optic gyroscope is provided. A method is provided for calibrating a fiber optic gyroscope. First and second portions of light from a first light source are propagated through a fiber optic line in respective first and second directions. A first voltage that causes a predetermined phase shift between the first and second portions of the light from the first light source is calculated. First and second portions of light from a second light source are propagated through the fiber optic line in the respective first and second directions. A second voltage that causes the predetermined phase shift between the first and second portions of the light from the second light is calculated. A difference between the first voltage and the second voltage is then calculated.

20 Claims, 4 Drawing Sheets

METHOD AND SYSTEM FOR CALIBRATING A FIBER OPTIC GYROSCOPE

TECHNICAL FIELD

The present invention generally relates to a method and system for calibrating a fiber optic gyroscope, and more particularly relates to a method and system for calibrating a fiber optic gyroscope using a reference light source with a known wavelength.

BACKGROUND

In recent years fiber optic gyroscopes (FOGs) have become widely used in several technologies to sense the rotation and angular orientation of various objects, such as aerospace vehicles. A FOG typically includes an optical fiber, often several kilometers in length, wound in a coil about an axis of rotation (i.e., the rotation to be sensed). Light is injected in opposite directions through the coil and directed onto a photo-detector. If the coil is rotated about the axis, the effective optical path length for the light traveling in one direction in the coil is increased, while the path length is decreased for the light traveling in the opposite direction.

The difference in path length introduces a phase shift between the light waves traveling in opposite directions, known as the Sagnac Effect. As a result, an interference pattern is detected by the photo-detector, which indicates that the FOG is experiencing rotation. The output signal from the photo-detector typically follows a cosine function. That is, the output signal depends on the cosine of the phase difference between the two waves. Therefore, because the cosine function is even, the rate of change near zero is very small, resulting in poor sensitivity for low rotation rates. To improve sensitivity, the waves are often modulated by a particular voltage to generate a phase difference deviating from zero. The actual phase generated by the modulation voltage is referenced to a voltage $V_\pi$ that changes the light phase by 180° (or $\pi$ radians). The phase modulator reference voltage $V_\pi$ depends on the wavelength and environmental factors, such as temperature, humidity, and pressure.

The amplitude of the Sagnac phase shift caused by a rotation rate determines the FOG "scale factor," which numerically relates the detected phase difference to the actual rotation being experienced by the FOG. As the fiber sensing coil length and diameter are increased, the scale factor also increases, and as a result, the FOG is more sensitive to rotation. The FOG scale factor also depends on wavelength of the light propagating in the fiber sensing coil. Due to imperfections in the light source and atrophy in the components of the FOG as well as environmental variables, the exact wavelength of the light being used is not known. Therefore, the exact scale factor can not be determined, and thus the FOG does not operate accurately.

Accordingly, it is desirable to provide a method for calibrating a fiber optic gyroscope scale factor by accurately measuring the wavelength of the light being used and environmental contributions of the phase modulator reference voltage $V_\pi$. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for calibrating a fiber optic gyroscope. First and second portions of light from a first light source are propagated through a fiber optic line in respective first and second directions. A first voltage that causes a predetermined phase shift between the first and second portions of the light from the first light source is calculated. First and second portions of light from a second light source are propagated through the fiber optic line in the respective first and second directions. A second voltage that causes the predetermined phase shift between the first and second portions of the light from the second light source is calculated. A difference between the first voltage and the second voltage is then calculated.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be noted that FIGS. 1-4 are merely illustrative and may not be drawn to scale.

Figure 1:
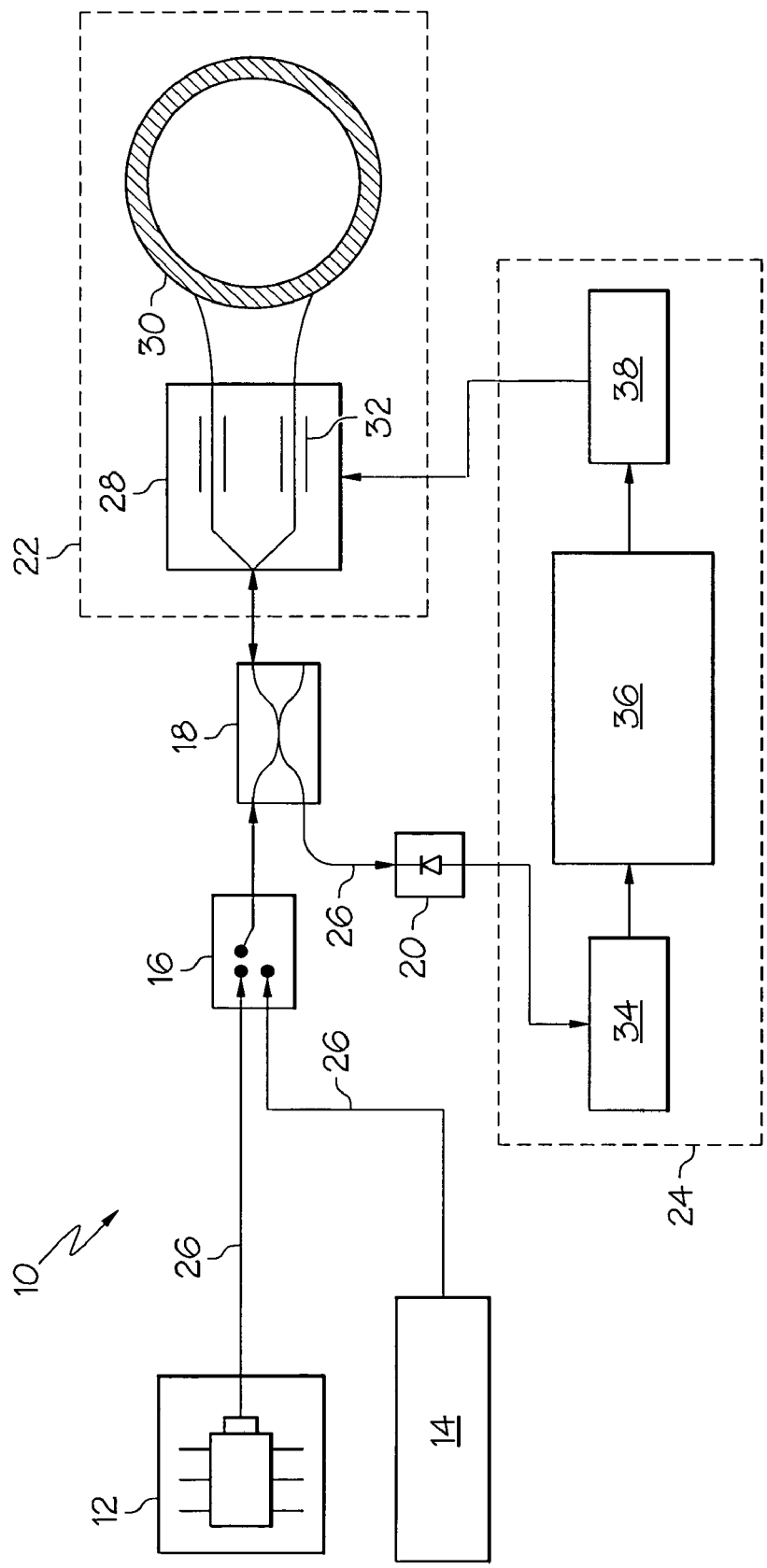
FIG. 1 is a schematic view of a fiber optic gyroscope system according to one embodiment of the present invention.
Figure 2:
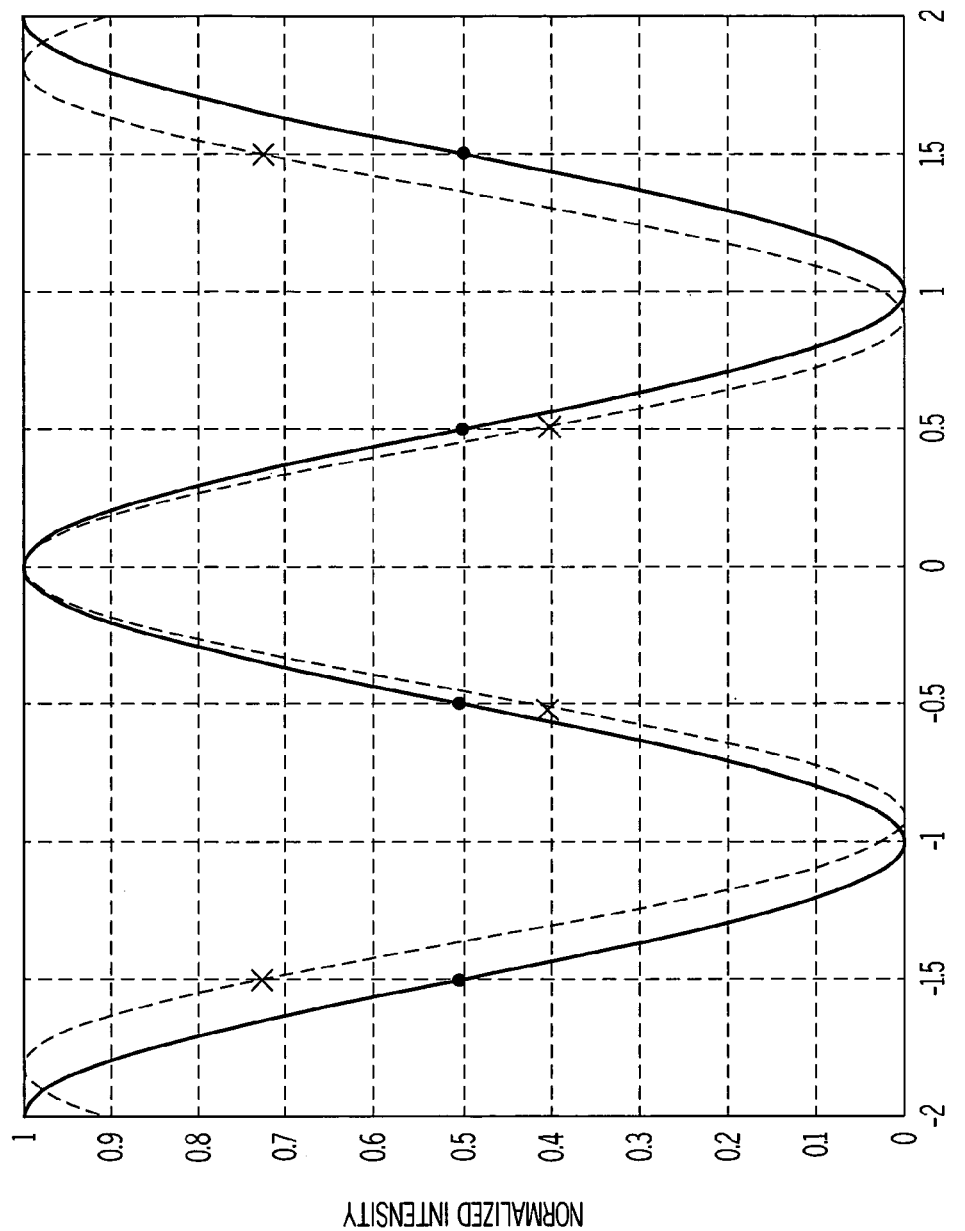
FIG. 2 is a graph illustrating the modulation of light waves within the system of FIG. 1.
Figure 3:
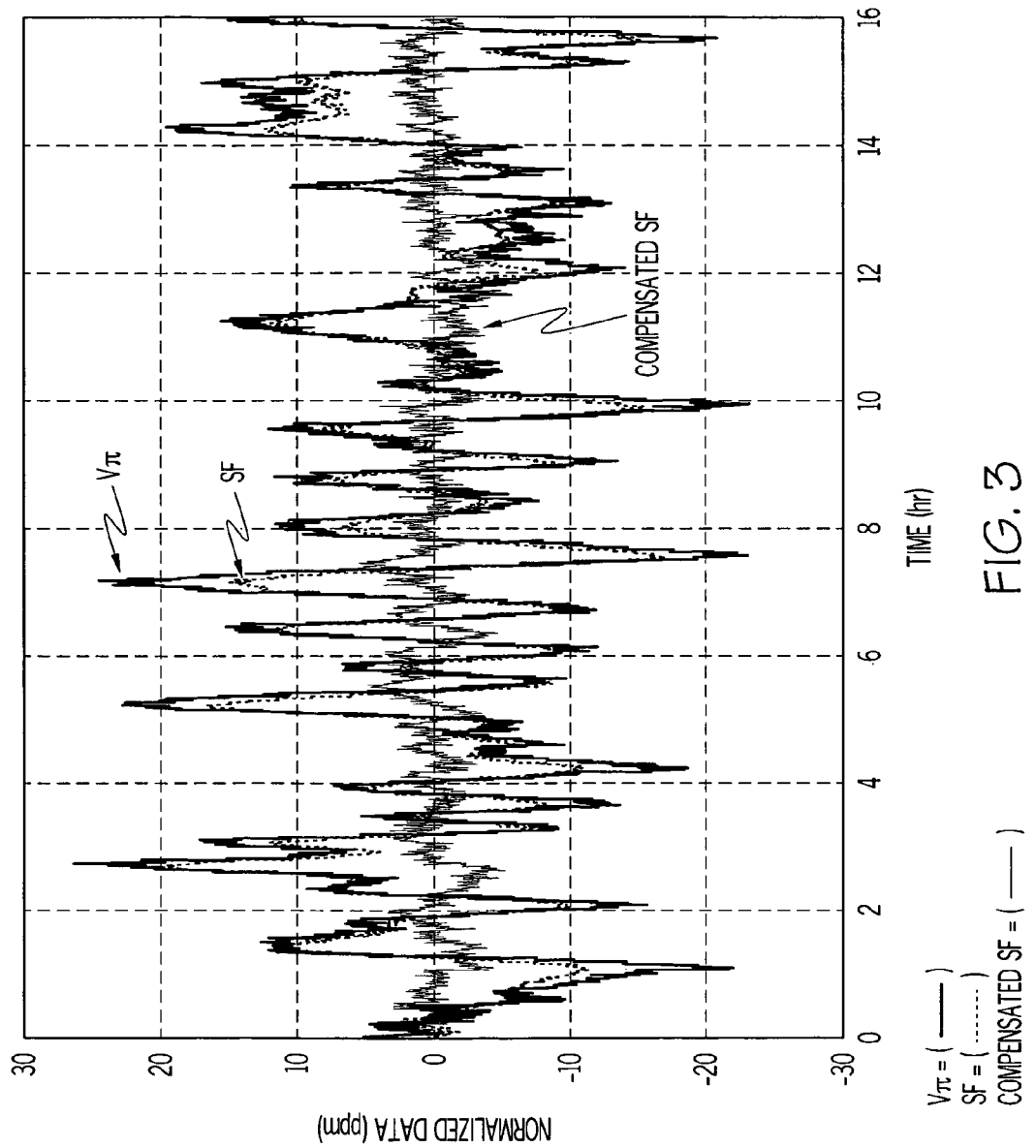
FIG. 3 is a graph comparing a modulation reference voltage, a scale factor, and a compensated scale factor used in the system of FIG. 1.

FIG. 1 to FIG. 3 illustrate a method and system for calibrating a fiber optic gyroscope (FOG). In general, and as will be discussed in more detail below, light is propagated from a first light source, split into two portions, and directed through a coil of fiber optic line, with one portion of the light traveling through the coil in a clockwise direction and the other portion traveling in a counterclockwise direction. A first voltage (i.e., total reference voltage) that causes a phase shift between the first portion and second portion of the light from the first light source to be a selected angle is then calculated. Light from a second light source, with a known wavelength, is then sent into the coil after being split into first and second portions. Likewise, the first and second portions of light from a second light source are respectively propagated through the fiber optic line in the clockwise and counterclockwise directions. A second voltage (i.e., calibration reference voltage) that causes a phase shift between the first and second portions of the light from the second light source to be the selected angle is then calculated. A difference between the first voltage and the second voltage is then calculated, which is used to determine the actual wavelength of the light from the first light source and a scale factor for the FOG.

FIG. 1 illustrates a fiber optic gyroscope system 10 according to one embodiment of the present invention. The system 10 includes a light source 12, a reference light source 14, an optical switch 16, an optical coupler 18, a photo-detector 20, a sensing loop assembly 22, a processing subsystem 24, and fiber optic lines 26 interconnecting various components of the system 10.

The light source (i.e., first light source) 12 is any light source typically used in fiber optic gyroscopes, such as a Fiber Light Source (FLS) assembly. In one embodiment, the light source includes a 980 nm semiconductor pump laser containing an erbium doped fiber (EDF) capable of generating light with a wavelength of approximately 1532 nm with an approximate bandwidth of 35 nm. However, as described in greater detail below, the actual wavelength of the light, as it propagates through the system 10, is not known. Conversely, the reference light source (i.e., second light source) 14, as is also described in greater detail below, is capable of generating light with a known wavelength. No matter how each light source 12 or 14 is specifically implemented, the light generated is directed, via the fiber optic lines 26, into the optical switch 16.

The optical switch 16 is, in one embodiment, a 2×1 optical switch that includes two inputs and one output, as is commonly understood in the art. The optical switch inputs are respectively coupled to receive the light from the light source 12 and the reference light source 14. The optical switch 16 is controllably moveable between a first position, in which light from the light source 12 is sent to the coupler 18, and a second position in which light from the reference light source 14 is sent to the coupler 18.

In the depicted embodiment, the optical coupler 18 is a 50/50 coupler, or splitter, as is commonly understood in the art. The coupler 18 is coupled, via the fiber optic lines 26, to the output of the optical switch 16, the photo-detector 20, and to the sensing loop assembly 22. As is commonly understood, the coupler 18 receives light from one terminal (i.e., input) thereof and splits the light amongst at least two other terminals (i.e., outputs). In the example illustrated in FIG. 1, light that is sent from the optical switch 16 through the coupler 18 will be split into two "parts," with one part being sent to the sensing loop assembly 22 and the other part not being used. Light that is traveling in the opposite direction (i.e., from the sensing loop assembly 22) is split such that one part is sent back to the optical switch 16 and the other is sent to the photo-detector 20. The photo-detector 20 is connected between the coupler 18 and the processing subsystem 24 and includes a photodiode, as is commonly understood.

The sensing loop assembly 22 includes an integrated optics chip (IOC) 28 and a fiber sensing coil 30. The IOC 28 is an electro-optic crystal phase modulator, as is commonly understood. The IOC 28 includes a "Y" splitter connected to the coupler 18 through a fiber optic line 26 and a series of electrodes 32. The Y splitter splits the fiber optic line 26 into the fiber optic segments within the fiber coil 30, and the electrodes 32 are used to modulate the light signal that is received from the coupler 18. Although the present invention may be practiced with various types of phase modulators, in a preferred embodiment, the IOC 28 uses "square wave" bias modulation and is fabricated using $LiNbO_3$. The fiber sensing coil, or loop, 30 is a winding of fiber optical cable having a length of, for example, between 1 and 6 km.

The processing subsystem 24, as will be appreciated by one skilled in the art, may include electronic components, including various circuitry and integrated circuits, such as an Application Specific Integration Circuit (ASIC) and/or instructions stored on a computer readable medium to be carried out by a computing system and perform the methods and processes described below. In the embodiment illustrated in FIG. 1, the processing subsystem 24 includes an analog-to-digital converter (ADC) 34, a microprocessor 36, and a digital-to-analog converter (DAC) 38. Although not specifically illustrated, the processing subsystem 24 may also include several amplifiers. A first amplifier may be connected to an output of the photo-detector 20 to provide suitable signal buffer and to increase or decrease the overall gain of the output signal received from the photo-detector. The ADC 34 converts the analog signal received from either the first amplifier, if included, or the photo-detector 20 into digital data representative thereof and supplies the digital data to the microprocessor 36. The DAC 38 and a second amplifier, if included, are sequentially connected to an output of the microprocessor 36. The DAC 38, as is generally known, converts digital data supplied from the microprocessor 36 into analog signals representative thereof. An output of the second amplifier, if included, is connected to the IOC 28 within the sensing loop assembly 22. The microprocessor 36 is coupled between the ADC 34 and the DAC 38 and is preferably in operable communication with the optical switch 16.

During operation, the microprocessor 36 controls the position of the optical switch 16 to supply light from the light source 12 or the reference light source 14 to the remainder of the system 10 to respectively determine a "total reference voltage" and a "calibration reference voltage," which are needed to modulate the light waves properly as the different light sources as being used. A difference between the total reference voltage and the calibration reference voltage is determined and used to adjust the scale factor of the system 10, as is described below.

As will be appreciated by one skilled in the art, the FOG scale factor (SF) can be defined by the following equation:

$$\frac{\phi}{\Omega} = \frac{2\pi L D}{\lambda c}, \tag{1}$$

where $\phi$ is the phase difference of the counter propagating light waves, $\Omega$ is the rotation rate of the coil, $\lambda$ is the wavelength of the propagating light waves, c is the speed of light, and L and D are the fiber sensing coil length and diameter, respectively. As is evident in Equation (1), the scale factor is inversely proportional to the wavelength of the light waves that are counter propagating in the fiber sensing coil. Therefore, any instability in the wavelength has a direct impact on the accuracy of the scale factor.

Wavelength instability, or drift, arises from both passive optical components, such as the optical coupler 18, and active optical components, such as the light source 12, because the components may be sensitive to environmental changes (i.e., temperature, pressure, and humidity) and atrophy. Additionally, the light source 12 may add to wavelength instability due to inconsistency in the performance of the power supply of the light source 12. Furthermore, in a depolarized FOG, the depolarization of light using a wavelength division technique could also cause wavelength drift through random wandering of the light polarized in a single mode (SM) sensing fiber coil. This instability leads to uncertainty in the reference voltage that is to be used to modulate the light waves.

The reference voltage $V_\pi$ as a function of wavelength (i.e., the wavelength sensitivity of $V_\pi$) may be expressed as $$V_\pi(\lambda) = \frac{\lambda d}{n_0^3 \gamma_{33} l}, \quad (2)$$

where $\lambda$ is the wavelength of the propagating wave, $n_0$ is the ordinary refractive index of the phase modulator substrate, and $\gamma_{33}$ is an electro-optical coefficient, d is the electrode distance, and l is the phase modulator channel length. Because of the wavelength sensitivity, the reference voltage $V_\pi$ may be monitored and used to correct for the wavelength-induced scale factory inaccuracy. However, the environmental sensitivity of the phase modulator reference voltage is impossible to model for the duration of the FOG instrument life because of performance degradation.

Referring again to FIG. 1, light passes from the optical switch 16, through the coupler 18, and into the IOC 28. The IOC 28 splits the light into counter propagating waves in the sensing coil 30, polarizes the light, and modulates the light phase, as is commonly understood. As was noted above, the IOC 28 implements a square wave bias modulation technique, in one embodiment, to shift away from the zero phase point and increase the phase sensitivity in the interferogram. The modulation depth can be selected at different phase points depending on the specific application. Examples include $\pm \pi/2$, $\pm 3\pi/4$, $\pm 7\pi/8$, and $\pm 15\pi/16$.

The phase modulator reference voltage $V_\pi$(i.e., the voltage required for the phase modulator to change the light phase by 180 degrees) can be measured from the modulation technique. FIG. 2 shows one method of measuring $V_\pi$. If the voltage used to provide modulation points at $\pm \pi/2$ and $\pm 3\pi/2$ matches the actual phase modulator reference voltage, the signal detected by the photo-detector 20 is a flat line as indicated by the circular points. If the voltage does not match the phase modulator reference voltage, a signal with a modulation pattern (i.e., a square wave, as indicated by the Xs) will be detected by the photo-detector 20. The amplitude of the photo-detector signal can be processed in the microprocessor 36 after passing through the ADC 34 and outputted with the updated reference voltage to the DAC 38. The process, similar to a servo operation with proper feedback gain, continues until the modulation pattern is nullified.

Referring again to FIG. 1, during normal operation, the optical switch 16 is toggled to send light from the light source 12 into the sensing loop assembly 22. As described above, using the light from the light source 12, the total reference voltage is determined and may be expressed as $$V_\pi^{TOTAL} = V_\pi^0 + \Delta V_\pi^\lambda + V_\pi^{ENV}, \quad (3)$$

where $V_\pi^{ENV}$ is the environmental contribution and $V_\pi^\lambda$ is the wavelength contribution of the $V_\pi^{TOTAL}$ in addition to the default value $V_\pi^0$. To calibrate the system 10, the optical switch 16 is toggled by the microprocessor 36 so that light from the reference light source 14 is sent to the sensing loop assembly 22. The light from the reference light source 14 is used to determine the calibration reference voltage, which because the wavelength of the reference light source is known, includes only the default value of the reference voltage and the environmental contribution (i.e., $V_\pi^0 + V_\pi^{ENV}$).

The wavelength contribution $V_\pi^\lambda$ is then calculated by subtracting the calibration reference voltage from the total reference voltage. The actual wavelength of the light from the light source 12 is then determined from Equation (2), and then, using the determined actual wavelength, the scale factor is determined using Equation (1).

Referring again to FIG. 1, the system 10 can be re-calibrated by switching between the operation mode and the calibration mode via the optical switch 18, as described above. The amount of time between calibrations may be determined by such factors as how often the system 10 is used and environmental changes. The environmental variables typically do not significantly change over a period any shorter than a few minutes. Therefore, the optical switch 16 does not need to have high speed characteristics to minimize the interruption of normal operation. It should be noted that the interruption during calibration can be eliminated by further modulating the light from the light source and/or the reference light source. The modulated light source signal can be detected and used to separate the $V_\pi$ contribution from the other light source in the microprocessor 36.

FIG. 3 graphically compares test results of $V_\pi$, SF, and compensated SF for the system 10 over a period of approximately sixteen hours. As dictated by Equation (2), there is strong correlation between $V_\pi$ and SF. The compensated SF based on the wavelength contribution of $V_\pi$ indicates the amount of inaccuracy in the uncompensated SF.

Figure 4:
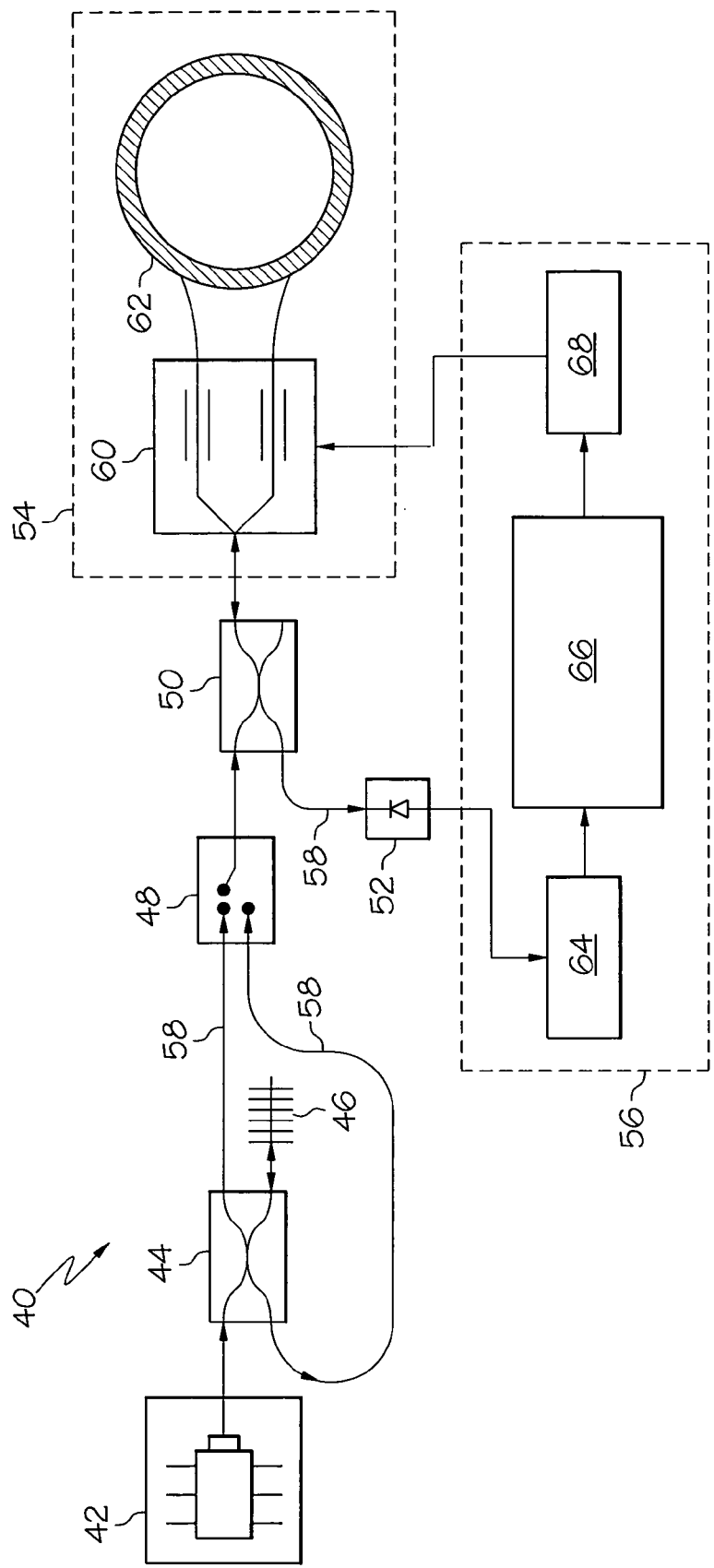
FIG. 4 is a schematic view of a fiber optic gyroscope system according to an alternative embodiment of the present invention.

FIG. 4 illustrates a fiber optic gyroscope system 40, similar to the system illustrated in FIG. 1, according to an alternative embodiment of the present invention. The system 40 shown in FIG. 4 includes a light source 42, a first coupler 44, a reflective Fiber Bragg Grating 46, an optical switch 48, a second coupler 50, a photo-detector 52, a sensing loop assembly 54, a processing subsystem 56, and various fiber optic lines 58 interconnecting the various components. It should be noted that the light source 42, the optical switch 48, the second coupler 50, the photo-detector 52, and the sensing loop assembly 54 may be substantially identical to similarly named components shown in FIG. 1. Thus, the sensing loop assembly 54 includes an IOC 60 and a fiber coil 62.

As will be appreciated by one skilled in the art, in the embodiment illustrated in FIG. 4, the first coupler 44 and the Fiber Bragg Grating 46 are substituted for the reference light source 14 shown in FIG. 1. The first coupler 44, in one embodiment, is a 90/10 coupler connected between the light source 42 and the optical switch 48. The Fiber Bragg Grating 46 is connected to the first coupler 44 on a side opposing the light source 42. Although not specifically illustrated, the Fiber Bragg Grating 46 includes a segment of fiber optic line with portions having varying indices of refraction. As a result, the grating will transmit most wavelengths of light, but will reflect certain, specific wavelengths. Therefore, only a very specific wavelength of light will be reflected back through the first coupler 44, through the optical switch 48 and the second coupler 50, and into the sensing loop assembly 54. As is described above, this known wavelength is used to determine the wavelength contribution $V_\pi^\lambda$ to the total reference voltage, and subsequently, adjust the scale factor.

One advantage of the method and system describe above is that because the wavelength instability and environmental factors are accounted for, the reference voltage, wavelength of the light, and thus, the scale factor of the FOG may be accurately determined. Therefore, the accuracy of the performance of the FOG is improved. Another advantage is that the FOG can be easily re-calibrated by using the reference light source as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for calibrating a fiber optic gyroscope comprising:
   propagating first and second portions of light from a first light source through a fiber optic line in respective first and second directions;
   determining a first voltage operable to cause a predetermined phase shift between the first and second portions of the light from the first light source;
   applying the first voltage to a modulator to cause a first phase shift between the first and second portions of the light from the first light source;
   determining a first phase shift between the first and second portions of the light from the first light source;
   propagating first and second portions of light from a second light source through the fiber optic line in the respective first and second directions;
   determining a second voltage operable to cause the predetermined phase shift between the first and second portions of the light from the second light source;
   applying the second voltage to the modulator to cause a second phase shift between the first and second portions of the light from the second light source;
   determining a second phase shift between the first and second portions of the light from the first light source; and
   determining a difference between the first voltage and the second voltage.

2. The method of claim 1, further comprising determining a wavelength of the light from the first light source using the difference between the first voltage and second voltage.

3. The method of claim 2, further comprising determining a scale factor for the fiber optic line using the wavelength of the light from the first light source.

4. The method of claim 3, further comprising directing the first and second portions of light from the first light source and the first and second portions of light from the second light source onto a photo-detector.

5. The method of claim 4, wherein the respective phase shifts between the first and second portions of light from the first light source and the first and second portions of light from the second light source are measured at the photo-detector.

6. The method of claim 5, wherein the light from the second light source has a selected wavelength.

7. The method of claim 6, further comprising directing the light from the first light source into a reflective Fiber Bragg Grating, the reflective Fiber Bragg Grating being the second light source and reflecting the light from the first light source at the selected wavelength.

8. The method of claim 7, wherein the fiber optic line includes a coil and further comprising splitting the light from the first and second light sources into the respective first and second portions, the first portions propagating through the coil in the first direction and clockwise around the coil and the second portions propagating through the coil in the second direction and counterclockwise around the coil.

9. The method of claim 8, further comprising propagating the light from the first and second light sources through an optical switch such that only the light from one of the first and second light sources propagates through the coil.

10. The method of claim 8, further comprising:
    modulating the light from at least one of the first and second light sources; and
    detecting said modulated light from at least one of the first and second light sources at the photo-detector.

11. A method for calibrating a fiber optic gyroscope comprising:
    propagating first and second portions of light from a first light source through a fiber optic line in respective first and second directions;
    directing the first and second portions of the light from the first light source onto a photo-detector;
    determining a first voltage operable to cause a predetermined phase shift between the first and second portions of the light from the first light source at the photo-detector;
    applying the first voltage to a modulator to cause the predetermined phase shift between the first and second portions of the light from the first light source;
    propagating first and second portions of light from a second light source through the fiber optic line in the respective first and second directions;
    directing the first and second portions of the light from the second light source onto the photo-detector;
    determining a second voltage operable to cause the predetermined phase shift between the first and second portions of the light from the second light source at the photo-detector; determining a difference between the first voltage and the second voltage; and determining a scale factor for the fiber optic gyroscope using the difference between the first voltage and the second voltage; and
    applying the second voltage to the modulator to cause the predetermined phase shift between the first and second portions of the light from the second light source.

12. The method of claim 11, wherein said determination of the scale factor further comprises determining a wavelength of the light from the first light source using the difference between the first voltage and second voltage.

13. The method of claim 12, further comprising directing the light from the first light source into a reflective Fiber Bragg Grating, the reflective Fiber Bragg Grating being the second light source and reflecting the light from the first light source at a selected wavelength.

14. The method of claim 13, wherein the fiber optic line includes a coil, the respective first portions of light from the first and second light sources propagating clockwise through the coil and the respective second portions of light from the first and second light sources propagating counterclockwise through the coil.

15. The method of claim 14, wherein the coil has a length of between 1 and 6 km.

16. A fiber optic gyroscope comprising:
    a fiber optic sensing coil configured to receive light and counter propagate first and second portions of the light received therein;
    a first light source operable to supply light;
    a second light source operable to supply light;
    a switch optically coupled between the first and second light sources and the sensing coil, the switch being moveable between a first position, in which light from the first light source is supplied to the sensing coil, and a second position, in which light from the second light source is supplied to the sensing coil;

a processor in operable communication with the switch and configured to toggle the switch between the first and second positions, to thereby cause first and second portions of light from the first and second light sources, respectively, to counter propagating through sensing the coil, the processor further configured to determine a first voltage operable to cause a predetermined phase shift between the first and second portions of the light from the first light source, a second voltage operable to cause the predetermined phase shift between the first and second portions of the light from the second light source, and a difference between the first voltage and the second voltage;

a modulator between the optical fiber sensing coil and the first and second light sources, the modulator operable to cause the predetermined phase shift between the first and second portions of the light from the first light source when the first voltage is applied to the modulator, and operable to cause the predetermined phase shift between the first and second portions of the light from the second light source when the second voltage is applied to the modulator; and a photodetector operable to receive light from the optical fiber sensing coil and operable to detect a phase shift between the counter propagating portions of light.

17. The fiber optic gyroscope of claim 16, wherein the processor is further operable to determine a wavelength of the light from the first light source using the difference between the first voltage and second voltage.

18. The fiber optic gyroscope of claim 17, wherein said processor is further operable to determine a scale factor for the fiber optic gyroscope using the wavelength of the light from the first light source.

19. The fiber optic gyroscope of claim 18, wherein the second light source has a selected wavelength.

20. The fiber optic gyroscope of claim 19, wherein the second light source is a reflective Fiber Bragg Grating connected to the fiber optic line between the first light source and the switch, the Fiber Bragg Grating reflecting the light from the first light source at the selected wavelength.

* * * * *